United States Patent

Kurosawa et al.

[11] Patent Number: 5,162,957
[45] Date of Patent: Nov. 10, 1992

[54] TAPE CASSETTE HOUSING IMPROVED INSERTION GUIDES

[75] Inventors: Atsushi Kurosawa; Masami Fujimoto, both of Saitama, Japan

[73] Assignee: Pioneer Electronic Corporation, Tokyo, Japan

[21] Appl. No.: 688,699

[22] Filed: Apr. 22, 1991

Related U.S. Application Data

[63] Continuation of Ser. No. 382,495, Jul. 21, 1989, abandoned.

[30] Foreign Application Priority Data

Nov. 30, 1988 [JP] Japan ............................. 63-300639

[51] Int. Cl.⁵ .............................................. G11B 5/008
[52] U.S. Cl. ....................................... 360/96.5; 360/93
[58] Field of Search ................... 360/93, 96.5, 132, 60, 360/96.6

[56] References Cited

FOREIGN PATENT DOCUMENTS 0160822 11/1985 European Pat. Off. .
0189324 7/1986 European Pat. Off. .
0204585 12/1986 European Pat. Off. .

Primary Examiner—Andrew L. Sniezek
Attorney, Agent, or Firm—Finnegan, Henderson, Farabow, Garrett and Dunner

[57] ABSTRACT

A cassette insertion device comprising a holder for receiving a tape cassette, the holder having an upper inner surface with a first projection thereon for contacting an upper surface of the tape cassette and a lower inner surface having a second projection adapted to engage a pawl of the tape cassette to unlock a slider of the tape cassette, the first and second projections being laterally separated by a distance greater than or equal to the length of a lower projection formed on a lower surface of the tape cassette.

7 Claims, 3 Drawing Sheets

TAPE CASSETTE HOUSING IMPROVED INSERTION GUIDES

This application is a continuation of application Ser. No. 382,495, filed Jul. 21, 1989, abandoned.

FIELD OF THE INVENTION

The present invention relates to a cassette insertion device for inserting a digital audio tape cassette into a tape drive mechanism.

BACKGROUND OF THE INVENTION

A conventional cassette insertion device of the general type identified above is shown in FIG. 5. As shown in FIG. 5, a digital audio tape cassette 1 has a lid 2 for covering its tape-running plane, a slider 3 for locking the lid 2 in the closed position, and a pawl 4 insertable in a hole 3a formed through the slider 3 so as to lock the slider. A holder 5 holds and carries the tape cassette 1 so as to set the same in a tape running mechanism when the tape cassette 1 is inserted into the holder 5. The holder 5 has a first projection 5a which is formed on its upper inner surface and is brought into contact with the upper surface of the tape cassette 1. Formed on the lower inner surface of the holder 5 is a second projection 5b for urging the pawl 4 upwardly to release the locking of the slider 3. Also formed on the lower inner surface of the holder 5 is a claw 5c for engagement with the front end face of the slider 3 so as to slide the slider upon insertion or pushing-in of the tape cassette 1.

When the tape cassette 1 is inserted in the holder 5, the upper surface of the tape cassette 1 is urged downwardly by the first projection 5a, and the pawl 4 is urged upwardly by the second projection 5b. Therefore, the locking of the slider 3 by the pawl 4 engaged in the hole 3a is released, thus enabling the sliding of the slider 3.

The tape cassette 1 is then further pushed into the holder 5, so that the front end of the slider 3 is brought into engagement with the claw 5c. Therefore, when the tape cassette 1 is still further pushed into the holder, the slider 3 is caused to slide to a position near a lower projection 6 formed on the lower surface of the tape cassette 1, so that the locking of the lid 2 is released, as shown in FIG. 5.

In such a cassette insertion device, when the tape cassette 1 is accidentally inserted in the wrong direction, with the lid 2 directed inwardly, as shown in FIG. 6, the second projection 5b gets trapped in a recess lying between the lower projection 6 on the tape cassette and the slider 3. Since the upper surface of the tape cassette 1 is urged downwardly by the first projection 5a, it is difficult for the lower projection 6 to slide over the second projection 5b in its withdrawing direction.

SUMMARY OF THE INVENTION

An object of the present invention is a cassette insertion device that overcomes the above problem of the conventional cassette insertion device.

Another object of the present invention is a cassette insertion device wherein when the lower projection on the tape cassette is slid first beyond the second projection in the direction of withdrawal, the upper surface of the tape cassette is already withdrawn beyond the position where the upper surface of the tape cassette is urged downwardly by the first projection, thereby facilitating the removal of the tape cassette which has been inserted in the reverse direction.

These and other objects of the present invention are achieved by a cassette insertion device comprising a holder for receiving a tape cassette, the holder having an upper inner surface having a first projection for engaging an upper surface of the tape cassette and a second projection for urging a pawl of the tape cassette to unlock a slider therein, the first and second projections being laterally separated by a distance equal to or greater than the length of a lower projection formed on a lower surface of the tape cassette.

BRIEF DESCRIPTION OF THE DRAWINGS

The manner by which the above objects, and other objects, features, and advantages of the present invention are attained will be fully apparent from the following detailed description when considered in view of the drawings herein.

DETAILED DESCRIPTION

Figure 3:
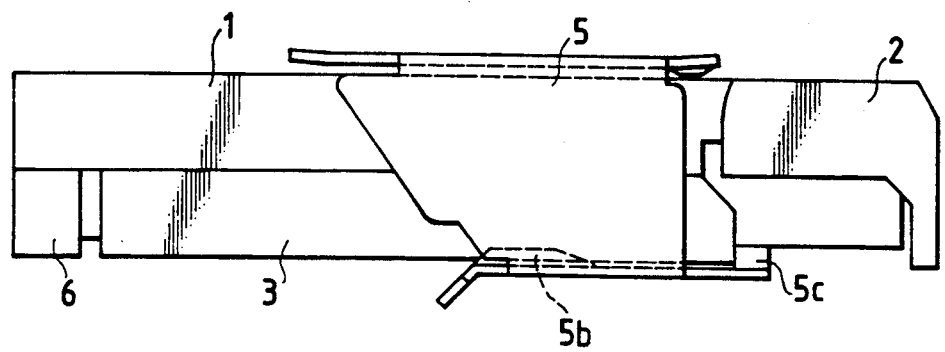
FIG. 3 is a cross-sectional view of the cassette insertion device of FIG. 1.
Figure 4:
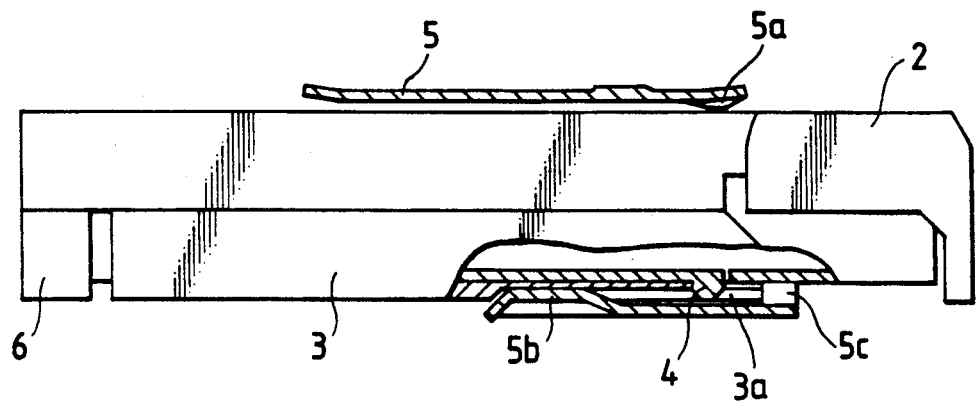
FIG. 4 is a partial cross-sectional view of the device of FIG. 1, showing the tape cassette inserted in a reverse direction.
Figure 5:
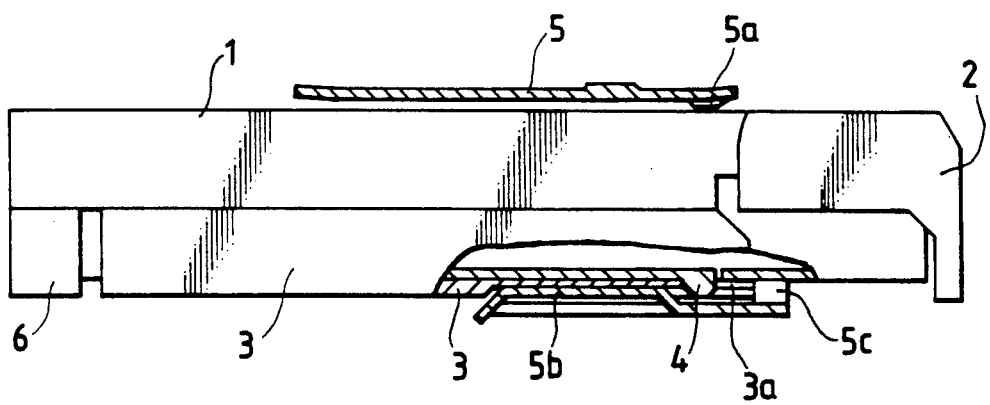
FIG. 5 is a cross-sectional view of a conventional cassette insertion device, showing a tape cassette in its inserted condition.
Figure 6:
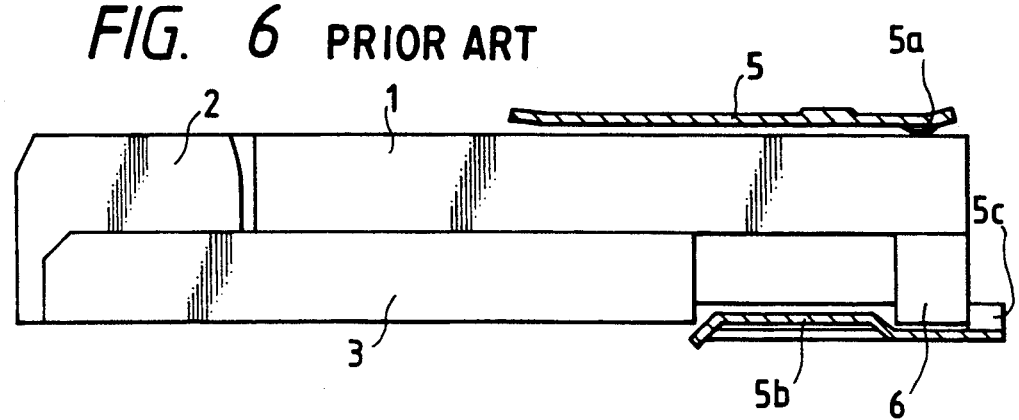
FIG. 6 is a cross-sectional view of the device of FIG. 5, showing the tape cassette inserted in a reverse direction.

One perferred embodiment of the invention will now be described with reference to FIGS. 2 to 4 in which parts common to those shown in FIG. 5 are denoted by the same reference numerals as used in FIG. 5.

Figure 2:
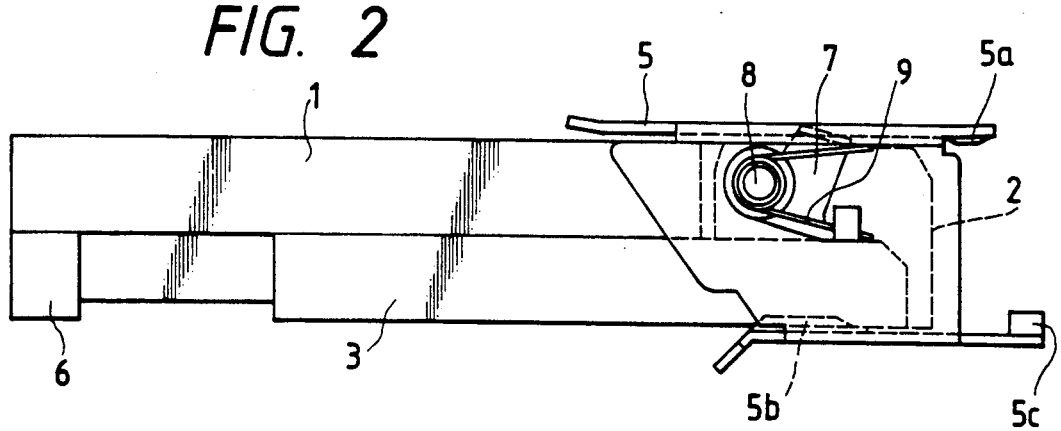
FIG. 2 is a side-elevational view of the cassette insertion device of FIG. 1 showing the tape cassette in its inserted condition.

In FIG. 2, a depression plate 7 is mounted on a shaft 8 mounted on a holder 5, and is urged by a torsion spring 9 mounted around the shaft 8. The depression plate 7 serves to depress or downwardly urge a tape cassette 1, inserted into the holder 5, so as to assist a second projection 5b in upwardly urging a pawl 4 to release a slider 3. The depression plate 7 also urges the tape cassette 1 against the lower inner surface of the holder 5.

Figure 1:
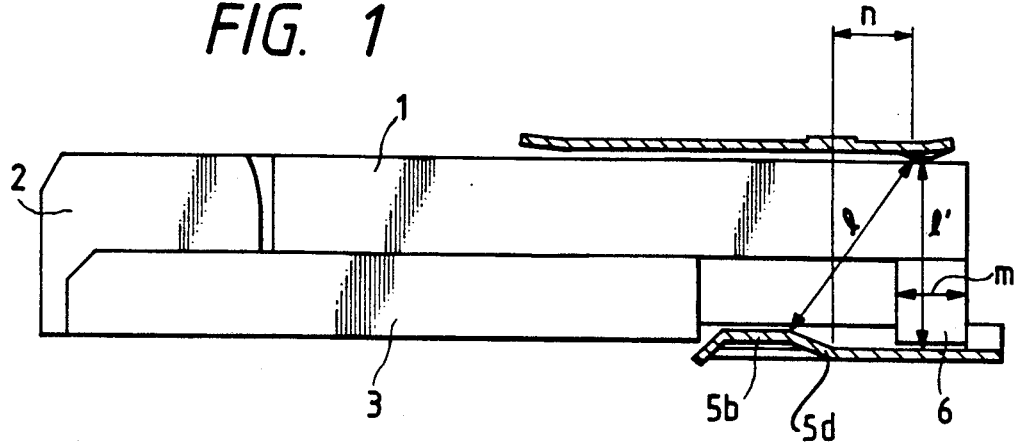
FIG. 1 is a side-elevational view of a preferred embodiment of the cassette insertion device of the present invention wherein a cassette has been inserted in the reverse direction.

As shown in FIG. 1, the distance n between a first projection 5a and the second projection 5b both of which are formed on the holder 5 is equal to or greater than the length m of a lower projection 6 formed on the lower surface of the tape cassette 1. The surface of the end 5d of the second projection 5b formed near a claw 5c slants gently.

The construction of the cassette insertion device of the present invention is closely similar to that of the prior art in that when the tape cassette 1 is inserted into the holder 5, the depressing force produced by the depression plate 7 assists the second projection 5b in urging the pawl 4 upward to cause the claw 5c to slide the slider 3.

As shown in FIG. 1, when the tape cassette 1 is inserted in the wrong direction, with a lid 2 directed inwardly, the leading or inner end face of the tape cassette 1 abuts against the claw 5c because of the downward urging forces of the first projection 5a and the depression plate 7 in such a manner that the lower projection 6 is fitted in a recess lying between the claw 5c and the second projection 5b.

Figure 7:
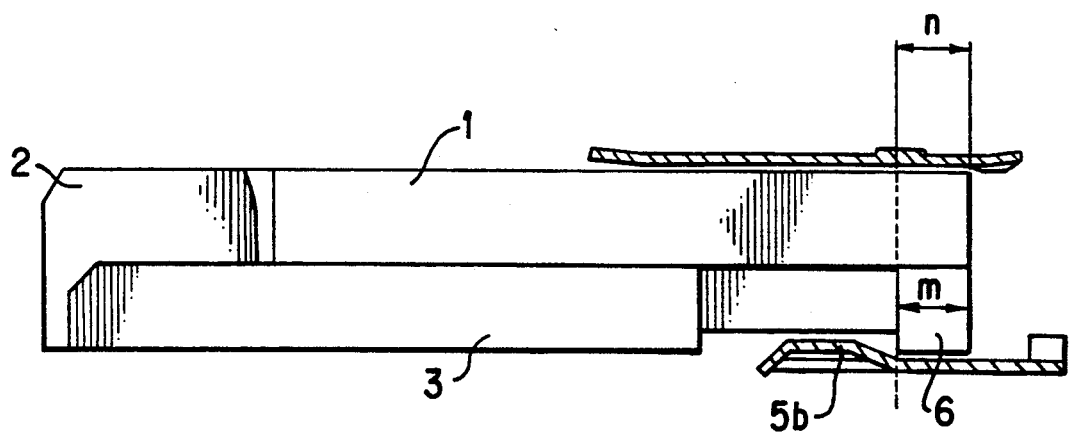
FIG. 7 is a side-elevational of view of a preferred embodiment of the cassette insertion device of the present invention as shown in FIG. 1 wherein the cassette has been inserted in reversed direction.

In this condition, when the tape cassette is to be withdrawn or removed, the lower projection 6 can be easily moved back until it is brought into engagement with the second projection 5b as shown in FIG. 7.

At this time, since the distance n between the first and second projections 5a and 5b is equal to or greater than the length m of the lower projection 6, the inner end of the tape cassette 1 is disposed outwardly of the first projection 5a. Therefore, the first projection 5a does not interfere with the tape cassette 1 when the tape cassette 1 is displaced upwardly.

In this condition, when the tape cassette 1 is further withdrawn, the lower projections 6 moves on the second projection 5b.

At this time, since the inclination of the surface of the second projection 5b is gentle, it does not offer a great resistance to the withdrawal of the tape cassette 1, and the depression plate 7 can be easily urged upwardly by the withdrawal of the tape cassette 1.

Thus, the tape cassette 1 inserted in the reverse direction (backwards) can be easily removed.

As described above, in the present invention, the distance between the first projection, formed on the upper inner surface of the holder, and the second projection, formed on the lower inner surface of the holder so as to urge the slider-locking pawl, is equal to or greater than the length of the lower projection on the tape cassette. The inclination of the inner surface of the second projection is gentle. With this construction, the tape cassette, inserted in the wrong direction, can be easily removed.

Therefore, difficulty is not encountered when removing the tape cassette inserted in the wrong direction, as is the case with the conventional cassette insertion device. This much makes allowance for the wrong insertion of the tape cassette.

What is claimed is:

1. A cassette insertion device for use with a tape cassette that includes a cassette body having first and second ends, a top half having a top surface and a bottom half having a lower projection at the first end of the tape cassette, a tape running plane at the second end of the tape cassette, a lid for covering the tape running plane, and a slider for locking the lid when the first end of the tape cassette is inserted into a tape cassette player and for sliding in a lateral direction to unlock the lid when the second end of the tape cassette is inserted into the tape cassette player, the cassette insertion device comprising:
   a first projection for engaging the top surface of the cassette body; and
   a second projection for engaging the bottom half of the cassette body, the second projection providing means for urging the slider to unlock the lid when the second end of the tape cassette is inserted into a tape cassette player, the minimum distance in the lateral direction between the first and second projections being greater than or equal to the length in the lateral direction of the lower projection on the tape cassette body, the minimum distance in the lateral direction being defined by two points on the respective portions of the first and second projections nearest to each other with respect to the lateral direction;
   wherein said first projection is prevented from engaging the top surface of the cassette body when said second projection abuts against the lower projection portion of the cassette tape.

2. A cassette insertion device according to claim 1, wherein the tape cassette further includes a pawl for abutting the slider to lock the slider, and wherein the second projection is adapted to engage the pawl to unlock the slider when the tape cassette is properly inserted in a cassette player.

3. A cassette insertion device according to claim 2, wherein the second projection further includes a claw for engaging the slider to slide the slider.

4. A cassette insertion device according to claim 3, wherein the second projection includes an inclined surface for engaging the pawl when said tape cassette is inserted into a cassette player.

5. A cassette insertion device for use with a tape cassette that includes a cassette body having first and second ends, a top half having a top surface and a bottom half having a lower projection at the first end of the tape cassette, a tape running plane at the second end of the tape cassette, a lid for covering the tape running plane, and a slider for locking the lid when the first end of the tape cassette is inserted into a tape cassette player and for sliding in a lateral direction to unlock the lid when the second end of the tape cassette is inserted into the tape cassette player, the cassette insertion device comprising:
   a first projection for engaging the top surface of the cassette body; and
   a second projection for engaging the bottom half of the cassette body, the second projection providing means for urging the slider to unlock the lid when the second end of the tape cassette is inserted into a tape cassette player;
   the first and second projections each having an inclined portion, the inclined portions opposing each other and being apart from each other by a minimum distance in the lateral direction, the minimum distance in the lateral direction being defined by two points on the respective inclined portions of the first and second projections nearest to each other with respect to the lateral direction; and
   the minimum distance in the lateral direction between the first and second projections being greater than or equal to the length in the lateral direction of the lower projection on the tape cassette body to prevent said first projection from engaging the top surface of the cassette body when said second projection abuts against the lower projection portion of the cassette tape.

6. A cassette insertion device according to claim 5, wherein the tape cassette further includes a pawl for abutting the slider to lock the slider, and wherein the second projection is adapted to engage the pawl to unlock the slider when the tape cassette is properly inserted in a cassette player.

7. A cassette insertion device according to claim 6, wherein the second projection further includes a claw for engaging the slider to slide the slider.

* * * * *